(No Model.)
J. M. HARPER.
TUBE COMPRESSOR.
No. 504,268. Patented Aug. 29, 1893.
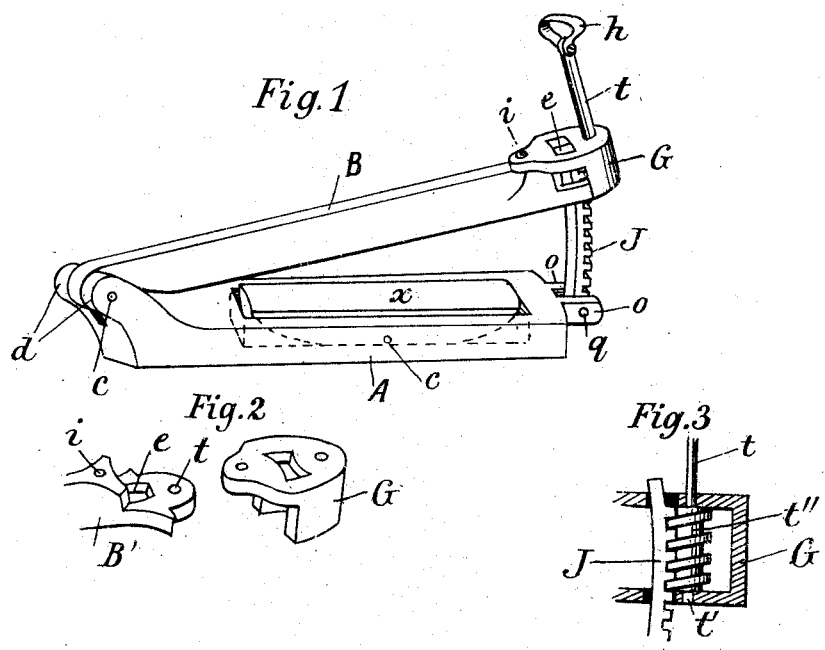
Witnesses:
Chas. E. Raabe,
Chas. Krenz
Inventor:
James M. Harper
By W. V. Tifft
Atty

United States Patent Office.

JAMES M. HARPER, OF PEORIA, ILLINOIS.

TUBE-COMPRESSOR.

SPECIFICATION forming part of Letters Patent No. 504,268, dated August 29, 1893.

Application filed July 9, 1892. Serial No. 439,541. (No model.)

*To all whom it may concern:*

Be it known that I, JAMES M. HARPER, a citizen of the United States, residing at Peoria, in the county of Peoria and State of Illinois, have invented certain new and useful Improvements in Tube-Compressors; and I do hereby declare that the following is a full, clear, and exact description of the invention, which will enable others skilled in the art to which it appertains to make and use the same.

My invention relates to certain new and useful improvements in tube compressors, by means of which a tube compressor is provided being simple in construction, durable and cheap in first cost.

More particularly, my invention relates to a tube compressor designed to be used especially in connection with hose pipe, for the purpose of cut-off in the discharge of water therefrom.

My invention consists essentially of two hinged sections suitably formed to bear upon the hose pipe for the purpose of cutting off the flow of water therefrom, and of certain illustrated and specified means for clamping or drawing the sections together and the particular means adopted consists of certain screw connections between the particular parts especially designed for this purpose, as will hereinafter be more fully shown and described, in connection with the drawings and detailed description.

That my invention may be more fully understood, reference is had to the accompanying drawings, in which—

Figure 1 is a perspective view showing the construction of my tube compressor. Fig. 2 is a detailed view. Fig. 3 is a detailed view in section of the particular means and preferred method of operating the hinged plates or sections.

In the figures, A—B refer to the hinged sections, showing the relative form and adjustment of the said parts, while c—d show the means adopted for hinging the said sections.

O—O are separated extensions from the section A and J is a pivoted tongue provided with a worm rack and pivoted as at (q).

G, is a cap secured to the upper section B, as at (i), and designed to bear within the worm screw t'', provided with the shank (t) bearing through a perforation in the top of the said cap G and provided with a hand hold (h).

(e) is a slot in the top of the cap G, provided to permit the passage through of the tongue J; the section B is cut away at its forward extremity to provide an extension perforated at its bottom portion to form a journal bearing for the journal or lower extension from the worm screw as (t') and is also provided with a slot corresponding to slot (e) to permit the passage through of the tongue J as shown in detail in Fig. 2, the extended portion being designated by B', the slot by (e') and the journal bearing by (t').

x is a pivoted plate set in a recess in face of section A, and designed to act as a teeter.

In operation for the purpose of compressing a tube or hose pipe at a particular point to stop the flow of water therefrom or from a break therein, it is first adjusted in such manner that the sections A—B thereof will bear over the hose or with the hose between the said sections, when the pivoted tongue J is caused to enter the slot (e') until engagement or connection is made with the worm screw (t') which being integral with the shank (t) by turning the said shank by means of the hand hold (h) in the proper direction, the section B will be drawn down through and by means of the toothed connection between the pivoted tongue and the worm screw, the said pivoted tongue passing upward through slot (e) thus enabling the sections to be drawn together with any desired degree of compression upon the hose pipe, thus effectually stopping the flow of water therefrom.

The particular advantage of my improved device is that the same may be constructed very cheaply and with absolute effectiveness for the purpose designed, and is particularly valuable in that it frequently occurs that hose pipe will break when subjected to great pressure and by cutting off the flow of water therefrom by means of the clamp herein provided, many inconveniences attendant upon such breakages will be obviated, it being unnecessary when such cut off is provided to go some distance to the source of supply as for instance a hydrant, and where several hose pipes are attached to the same hydrant, such cutting off of the supply at the hydrant, in the usual construction of hydrant would stop the flow of water into each of the hose pipes thereto attached, thus risking or endangering property in times of conflagration, all these disadvantages being overcome by the use of my improved tube compressor.

The general form of the device, the material used therein, the location and arrangement of the various elements, the construction of the elemental parts used therein and the application of the principle of the pivoted tongue, provided with suitable threads and the screw and the other features of the device as shown, for the purpose of compressing tubes may be varied, substituted or interchanged to suit the special application in which they may be desired to be used.

The pivoted plate $x$ is useful in that when the pipe or hose which is desired to be compressed is placed between the sections the two sections being hinged as shown might act naturally to push the pipe out were not the pivoted plate provided which adjusts itself to resist this tendency and further, were the pivoted plate not provided the sections coming closer together at the hinged point in order to compress effectually might tend to cut the hose at this point. By means of the pivoted plate being provided, this difficulty or disadvantage is easily overcome.

Having thus fully described my invention, what I claim, and desire to secure by Letters Patent, is—

1. The combination, in a tube compressor, of the sections A—B hinged as at $c$—$d$ and having pivoted at the forward extremity of section A or between extensions O—O therefrom, the tongue J, provided with suitable threads, the extension B, formed with a slot in its forward extension and provided with the cap G, secured as at ($i$) and provided with slot ($e$) within which in connection with the extension B', is held the worm screw ($t''$) journaled as shown and provided with shank ($t$) and suitable hand hold for operating said worm screw, all substantially as described and set forth.

2. In a tube compressor, the combination with the hinged sections A—B with the section A, the pivoted tongue J, formed as shown and provided with suitable threads with the section B, the worm screw ($t''$) held in position as shown to operate in connection with the threaded and pivoted tongue J for the purpose of drawing the said sections A—B together, all substantially as described and set forth.

3. In a tube compressor, the combination with the hinged sections A—B, with the section A the pivoted tongue J, formed as shown and provided with suitable threads and with the pivoted plate ($x$); with the section B, the worm screw $t''$ held in position as shown to operate in connection with the threaded and pivoted tongue J for the purpose of drawing the said sections A—B together, all substantially as described and set forth.

In testimony whereof I affix my signature in presence of two witnesses.

JAMES M. HARPER.

Witnesses:
W. V. TEFFT,
R. N. M'CORMICK.